United States Patent
Burkhart et al.

(10) Patent No.: US 8,306,716 B2
(45) Date of Patent: Nov. 6, 2012

(54) METHOD FOR CONTROLLING THE DESIRED SPEED IN AN OVERRUN CONDITION FOR A VEHICLE COMPRISING A RETARDER

(75) Inventors: Hugo Burkhart, Ravensburg (DE); Bernd Aumann, Amtzell (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1255 days.

(21) Appl. No.: 12/059,066

(22) Filed: Mar. 31, 2008

(65) Prior Publication Data
US 2008/0262693 A1 Oct. 23, 2008

(30) Foreign Application Priority Data
Apr. 18, 2007 (DE) .......... 10 2007 018 153

(51) Int. Cl.
*B60T 10/00* (2006.01)
(52) U.S. Cl. ........ 701/93; 701/70; 303/125; 303/191
(58) Field of Classification Search .......... 701/93, 701/94, 97, 98, 70; 180/170; 303/125, 191, 303/192, 198
See application file for complete search history.

(56) References Cited

U.S. PATENT DOCUMENTS

| | | | |
|---|---|---|---|
| 4,235,320 A | 11/1980 | Polak et al. | |
| 5,238,080 A * | 8/1993 | Fastie | 180/178 |
| 6,299,263 B1 * | 10/2001 | Uematsu et al. | 303/192 |
| 7,134,985 B2 * | 11/2006 | Watanabe et al. | 477/186 |
| 7,410,447 B2 * | 8/2008 | Jamzadeh | 477/186 |
| 7,869,927 B2 * | 1/2011 | Uematsu | 701/70 |
| 2005/0137060 A1 * | 6/2005 | Kuras et al. | 477/214 |
| 2006/0199698 A1 * | 9/2006 | Eriksson et al. | 477/92 |
| 2006/0279137 A1 * | 12/2006 | Steen et al. | 303/20 |
| 2007/0004557 A1 * | 1/2007 | Steen et al. | 477/183 |

FOREIGN PATENT DOCUMENTS

| | | |
|---|---|---|
| DE | 29 23 406 C2 | 12/1979 |
| DE | 43 13 685 A1 | 9/1993 |
| DE | 44 20 116 A1 | 12/1995 |
| DE | 196 42 344 A1 | 4/1997 |
| DE | 101 45 915 A1 | 4/2003 |
| EP | 0 291 887 A2 | 11/1988 |
| WO | WO 94/10002 A1 * | 5/1994 |

* cited by examiner

*Primary Examiner* — Ruth Ilan
(74) *Attorney, Agent, or Firm* — Davis & Bujold, PLLC

(57) ABSTRACT

A method for controlling a desired speed of a vehicle having a retarder operating in an overrun condition is proposed, such that the desired speed of the vehicle is controlled by a continuously adjustable retarder braking system and/or an engine braking control system.

10 Claims, No Drawings

METHOD FOR CONTROLLING THE DESIRED SPEED IN AN OVERRUN CONDITION FOR A VEHICLE COMPRISING A RETARDER

This application claims priority from German Application Serial No. 10 2007 018 153.3 filed Apr. 18, 2007.

FIELD OF THE INVENTION

The present invention relates to a method for controlling the desired speed of a vehicle comprising a retarder, during an overrun condition.

BACKGROUND OF THE INVENTION

Conventional vehicles used for commercial traffic, the transport of heavy loads and construction machinery, in some cases, comprise a speed regulation unit (cruise control). Such devices serve to control the speed to a desired value, but in the prior art, no device for desired speed control is known, which can be used by the vehicle in an overrun condition during overrun condition of the vehicle.

A braking system having a hydrodynamic retarder and a friction brake is known from DE 2923406 C2 and in the brake system, uses input magnitudes, a braking demand pressure and a pressure, which increases with the speed of the retarder. In a control unit, from these input magnitudes, an application pressure that acts upon the friction brake and an effective pressure in the retarder are produced as output magnitudes. In this case, the control unit modifies the effective pressure of the retarder proportionally to the pressure that varies with the speed of the retarder and, at the same time, limits it to a pressure that corresponds approximately to the braking demand pressure. The effective application pressure on the control element of the friction brake is set as the difference between the braking demand pressure and the effective retarder pressure.

The purpose of the present invention is to indicate a method for controlling the desired speed of a vehicle that comprises a retarder, during a condition of overrun, whose implementation during the overrun operation of the vehicle can set and maintain a desired speed.

DETAILED DESCRIPTION OF THE INVENTION

Accordingly, it is proposed to control the desired speed during overrun operation with a continuously adjustable retarder and/or engine braking control system.

According to the invention, when a defined event takes place, for example when the accelerator pedal is released (the driver does not wish to drive any faster, but even perhaps to drive more slowly, if the engine idling losses are sufficient), the driving speed at that moment is "frozen" and a brief actuation of the brake pedal or brake lever reduces the desired speed by a certain amount, whereas longer actuation of the brake pedal or brake lever reduces the desired speed further and continuously until the brake pedal or brake lever is again released. Over this period, the retarder is controlled by an electronic control unit in such a manner that the desired speed is maintained, taking into account braking torque applied by the engine.

When the travel path of the brake pedal or brake lever exceeds a first threshold value, the amount by which the desired speed is to be reduced is increased more rapidly. It is provided that braking is only carried out by way of the working or service brake when the required braking torque exceeds the maximum retarder braking torque together with the engine braking torque or when the travel path of the brake pedal or brake lever exceeds a second threshold value.

It is possible for the driver to accelerate the vehicle again or to increase the desired speed value by reducing the braking force. For this, the corresponding input signal for the electronic system is generated by actuating an operating element. A suitable operating element is the accelerator pedal and with this function the first portion of the pedal's travel path is used, preferably during which there is no speed or torque demand on the engine.

It is also possible to design the brake pedal or brake lever so that this operating element can also be moved in the direction opposite to the "normal" operating direction. A "retraction" of the brake pedal or brake lever is interpreted by the electronic system as a command to accelerate the vehicle by reducing the braking force. When the driver releases the brake pedal or brake lever again, the speed of the vehicle at the time is "frozen".

By virtue of this concept, driving safety at high drive powers is increased due to the continuous speed control. In addition, driving comfort is improved since the driver does not need to make so many manual corrections.

Furthermore, the load on the components in the drivetrain is reduced because, by implementing the method according to the invention, a constant load is maintained and load fluctuations are largely avoided. Moreover, overloading of the drive components, due to excessive rotation speeds and/or excessive vehicle speed, is avoided. Advantageously, the load on the service brakes is also reduced such that they and/or the service brake cooling devices can be made having smaller dimensions or of a more simple structure.

The invention claimed is:

1. A method for adjusting a speed of a vehicle, equipped with a retarder, at a desired level while the vehicle is operated in an overrun condition, the method comprising the steps of:
    upon releasing an accelerator pedal, operating the vehicle in the overrun condition at a first desired speed;
    setting the first desired speed to be equal to a current speed of the vehicle when an accelerator pedal is released;
    maintaining the first desired speed by operation of the retarder, which is controlled by an electrical control unit, so that the retarder applies, as necessary, a braking torque generated by an engine;
    upon actuation of one of a brake pedal and a brake lever for a relatively short duration of time, reducing the speed of the vehicle from the first desired speed, by a certain amount, to a second desired speed by applying a braking torque by actuating at least one of a service brake and the retarder;
    upon actuation of one of the brake pedal and the brake lever for a relatively long duration of time, reducing the speed of the vehicle from the second desired speed to a third desired speed, with the further reducing of the speed of the vehicle being constant for an entire duration of the relatively long duration of time of actuation of the one of the brake pedal and the brake lever; and
    utilizing the retarder to apply the braking torque generated by the engine and maintaining the speed of the vehicle at one of the second desired speed and the third desired speed.

2. The method according to claim 1, further comprising the step of
    accelerating a reduction of the speed of the vehicle from the first desired speed to a fourth desired speed when a distance of actuation of one the brake pedal and the brake lever is greater than a first threshold value.

3. The method according to claim 1, further comprising the step of reducing the speed of the vehicle from the first desired speed to a fifth desired speed by additionally actuating the service brake, only if one of:
  a braking torque required to reduce the speed of the vehicle from the first desired speed to the fifth desired speed is greater than a maximum of a combination of a retarder braking torque and the engine braking torque; and
  a distance of actuation of one the brake pedal and the brake lever is greater than a second threshold value.

4. The method according to claim 1, further comprising the step of, when a travel path of the at least one of the brake pedal and the brake lever exceeds a first threshold value, increasing a rate by which the desired speed is reduced.

5. The method according to claim 1, further comprising the step of actuating an operating element to reduce a braking force and increase a value of the desired speed.

6. The method according to claim 1, further comprising the step of actuating an accelerator pedal to reduce a braking force and increase a value of the desired speed, and a first portion of the accelerator pedal's travel path is used increase the value of the desired speed, over the first portion of the accelerator pedal's travel path there is no demand made on the engine for either speed and torque.

7. The method according to claim 5, further comprising the steps of:
  utilizing one of a brake pedal and a brake lever as the operating element;
  operating one of the brake pedal and brake lever in a direction opposite to a "normal" operating direction, such that retracting one of the brake pedal and the brake lever is interpreted, by an electronic system, as a command for accelerating the vehicle by reducing the braking force; and
  holding the driving speed of the vehicle at the moment when the driver releases one of the brake pedal and the brake lever.

8. A method for adjusting a speed of a vehicle, equipped with a retarder, at a desired level while the vehicle is operated in an overrun condition, the method comprising the steps of:
  upon releasing an accelerator pedal, operating the vehicle in the overrun condition at a first desired speed;
  setting the first desired speed to be equal to a speed of the vehicle when an accelerator pedal is released;
  maintaining the first desired speed by operation of the retarder, which is controlled by an electrical control unit, so that the retarder applies a braking torque generated by an engine so as to avoid the vehicle from traveling at a speed greater than the first desired speed;
  upon actuation of one of a brake pedal and a brake lever for a relatively short duration of time, actuating at least the retarder and reducing the speed of the vehicle from the first desired speed, by a certain amount, to a second desired speed; and
  upon actuation of one of the brake pedal and the brake lever for a relatively long duration of time, actuating at least one of the retarder and a service brake so as to constantly reduce the speed of the vehicle for an entire duration of the relatively long duration of time of actuation of the one of the brake pedal and the brake lever.

9. The method according to claim 8, further comprising the step of, when a travel path of the at least one of the brake pedal and the brake lever exceeds a first threshold value, increasing a rate by which the desired speed is reduced.

10. The method according to claim 8, further comprising the step of accelerating a reduction of the speed of the vehicle from the initially set desired speed to another desired speed when a distance of actuation of one the brake pedal and the brake lever is greater than a first threshold value.

* * * * *